United States Patent Office 2,860,149
Patented Nov. 11, 1958

2,860,149

PROCESS FOR THE SAPONIFICATION OF 21-ESTERS OF 20-KETO PREGNANES

Bjarte Loken and George Rosenkranz, Mexico City, Mexico, assignors to Syntex S. A., Mexico City, Mexico, a corporation of Mexico No Drawing. Application January 10, 1955
Serial No. 481,035

Claims priority, application Mexico January 11, 1954

11 Claims. (Cl. 260—397.47)

The present invention relates to a process for the production of cyclopentanophenanthrene derivatives.

More particularly, the present invention relates to an improved process for the production of the steroidal compounds of the pregnene series having the 21-hydroxy-20-keto side chain, as well as in some instances a 17-hydroxy group, from the corresponding 21-esters or the corresponding 17,21-diesters.

The aforementioned side chain at C–17 characterizes many of the important cortical hormones, such as for example $\Delta^4$-pregnene-21-ol-3,20-dione (desoxycorticosterone) and $\Delta^4$-pregnene-17$\alpha$-21-diol-3,20-dione (Reichstein's Substance S). The various known processes for the production of these substances involve generally the production of their esters such as the acetate (see, for example, Ruschig U. S. Patent No. 2,554,473 which discloses the preparation of the acetate of desoxycorticosterone; Koechlin, Kritchevsky and Gallagher, J. A. C. S. 73, 189 (1951) which discloses the preparation of the 21-monoacetate of Reichstein's Substance S; and U. S. patent application of Ringold, Sondheimer and Rosenkranz, Serial No. 401,058, now U. S. Patent No. 2,802,839, filed December 29, 1953, which discloses the preparation of the 17,21-diacetate of Reichstein's Substance S).

For some therapeutic purposes it is desirable to obtain from these esters the corresponding free compounds. It is also desirable where these compounds are used as intermediates in the microbiological introduction of oxygen in position C–11, as for example in the production of Kendall's Compound F, that the free alcohols rather than the corresponding esters be used. The saponification of the steroidal 21-acyloxy-20-ketones has heretofore been recognized as a delicate operation accompanied by several secondary or side reactions. In general, a yield of 80% of theory has been considered satisfactory for commercial production of the free alcohols from the 21-esters.

In accordance with the present invention, the surprising discovery has been made that in the absence of oxygen the saponification of steroidal 21-acyloxy-20-ketones (with or without simultaneous saponification of 17-acyloxy groups) may be carried out with yields higher than 95% of the theoretical. We have further discovered in accordance with the present invention that potassium carbonate in solution in a lower aliphatic alcohol may be utilized for the saponification of 21-acyloxy groups as well as 17-acyloxy groups if present, if the reaction with potassium carbonate in lower aliphatic alcohol solution is carried out under an atmosphere of nitrogen and in the absence of oxygen at temperatures of approximately room temperature, i. e., approximately 23° C.

In practicing the process of the present invention, the 21-ester such as the 21-monoacetate of $\Delta^4$-pregnene-17$\alpha$-21-diol-3,20-dione, or the 17,21-diacetate of $\Delta^4$-pregnene-17$\alpha$-21-diol-3,20-dione is dissolved in a lower aliphatic alcohol solvent such as methanol or ethanol, the container is closed and under continuous stirring a stream of nitrogen is passed in while the temperature is adjusted to approximately 23° C. Thereafter a solution is added of anhydrous potassium carbonate in oxygen-free water (previously boiled to remove dissolved oxygen and then cooled under an atmosphere of nitrogen). The mixture is then kept for a limited period of time, as for example of the order of 1 hour at a temperature between approximately 23° C. and 25° C., and thereafter the acetic acid is added to neutralize the excess potassium carbonate. The resulting solution is then precipitated by adding the same to water containing sodium chloride and the mixture is stirred for a short period of time to achieve complete precipitation. The resultant product is then separated as by centrifuging and washed until all traces of sodium chloride are removed. Upon drying in a vacuum oven a high yield of the desired product, as for example $\Delta^4$-pregnene-17$\alpha$-21-diol-3,20-dione, is produced.

Although for the sake of illustration the process of the present invention has been described as applied to specific esters of substance S, i. e., the 21-acetate and the 17,21-diacetate, it is obvious that other esters and especially lower fatty acid esters or benzoates may be utilized. Further, the same reaction is applicable to other steroidal pregnane compounds free from a 17-hydroxy group such as esters of desoxycorticosterone or having 11-oxygen substituents, as for example esters of cortisone or Kendall's Compound F.

The following specific examples serve to illustrate but are not intended to limit the present invention:

*Example I*

70 kg. of the 21-monoacetate of $\Delta^4$-pregnene-17$\alpha$-21-diol-3,20-dione (melting point between 230 and 240° C.) was placed in a container of approximately 800 lt. capacity and 700 lt. of methanol was added. The container was closed, and under continuous stirring a stream of nitrogen was passed while the temperature was adjusted to 23° C. A solution was then added of 13 kg. of U. S. P. anhydrous potassium carbonate in 145 lt. of water previously boiled to remove dissolved oxygen and then cooled under an atmosphere of nitrogen. The mixture was kept for 60 minutes at a temperature between 23 and 25° C., and then 10 lt. of acetic acid was added while the stirring was being continued until the evolution of carbon dioxide ceased. The solution was transferred, by means of a pump of any other adequate attachment, into a precipitation tank containing 4,000 lt. of water and 175 kg. of sodium chloride, and the mixture was stirred for 30 minutes to achieve complete precipitation. The precipitate was collected by centrifugation and washed with distilled water until the filtrate gave a negative chloride test. The product was dried in a vacuum oven at 50° C, thus affording 61.4 kg. of $\Delta^4$-pregnene-17$\alpha$,21-diol-3,20-dione with a melting point of 202–205° C., $\alpha_D$ +125° C. (chloroform). This yield corresponds to 98.5% of the theoretical yield.

*Example II*

100 g. of the diacetate of $\Delta^4$-pregnene-17$\alpha$,21-diol-3,20-dione (melting point 216–219° C.) was suspended in 1 lt. of methanol, previously distilled over potassium hydroxide, at 20° C. and stirring under an atmosphere of nitrogen. A solution was then added of 32 g. of U. S. P. anhydrous potassium carbonate in 250 cc. of water previously boiled and cooled under an atmosphere of nitrogen. The temperature rose to 23° C. and the stirring was continued under an atmosphere of nitrogen. After 30 minutes, the free Substance S started to crystallize and the stirring under nitrogen was continued for a further 30 minutes at the same temperature of 23° C. 25 cc. of acetic acid was added and the crude Substance S was precipitated by pouring the solution into 6 lt. of ice water containing 250 g. of sodium chloride. The mixture was kept standing for ½ hour, filtered, and the precipitate was washed with distilled water. The analysis of this crude material by paper chromatography showed it to have a purity of 99%. Crystallization from ethyl acetate afforded 78.8 g. (98% of the theoretical yield) of Δ⁴-pregnene-17α,21-diol-3,20-dione with a melting point between 209 and 214° C., $\alpha_D$ + 122° (chloroform).

*Example III*

100 g. of the 17,21-diacetate of Δ⁴-pregnene-17α-21-diol-3,20-dione was treated in accordance with the method described in Example II, with the only difference that 1 lt. of ethanol was used instead of methanol, which had been previously distilled over potassium hydroxide. The yield of Substance S with a melting point higher than 209° C. was 97% of the theoretical yield.

*Example IV*

100 g. of the acetate of Δ⁴-pregnene-21-ol-3,20-dione was treated in acordance with the method described in Example II, thus giving 85 g. (96% of theory) of desoxycorticosterone with a melting point of 136–139° C.

We claim:

1. A process for the production of steroidal compounds of the pregnane series selected from the group consisting of 17,21-dihydroxy-20-keto compounds and 21-hydroxy-20-keto-compounds comprising saponifying corresponding steroidal compounds of the pregnane series selected respectively from the group consisting of 17,21-diesters and 21-esters with potassium carbonate in oxygen-free water solution in a lower aliphatic alcohol solvent under an inert atmosphere and at a temperature of approximately 23° C.

2. The process of claim 1 wherein the starting compound is the 21-monoacetate of Δ⁴-pregnene-17α,21-diol-3,20-dione and the product is Δ⁴-pregnene-17α,21-diol-3,20-dione.

3. The process of claim 1 wherein the starting compound is the 17,21-diacetate of Δ⁴-pregnene-17α,21-diol-3,20-dione and the product is Δ⁴-pregnene-17α,21-diol-3,20-dione.

4. The process of claim 1 wherein the lower aliphatic alcohol is methanol.

5. The process of claim 2 wherein the lower aliphatic alcohol is methanol.

6. The process of claim 3 wherein the lower aliphatic alcohol is methanol.

7. The process of claim 1 wherein the lower aliphatic alcohol is ethanol.

8. The process of claim 2 wherein the lower aliphatic alcohol is ethanol.

9. The process of claim 3 wherein the lower aliphatic alcohol is ethanol.

10. The process of claim 1 wherein the starting compound is the acetate of Δ⁴-pregnene-21-ol-3,20-dione and the product is Δ⁴-pregnene-21-ol-3,20-dione.

11. The process of claim 10 wherein the lower aliphatic alcohol is methanol.

References Cited in the file of this patent

UNITED STATES PATENTS

| | | |
|---|---|---|
| 2,311,102 | Wettstein | Feb. 16, 1943 |
| 2,312,480 | Reichstein | Mar. 2, 1943 |
| 2,409,798 | Reichstein | Oct. 22, 1946 |
| 2,440,874 | Reichstein | May 4, 1948 |
| 2,492,192 | Sarett | Dec. 27, 1949 |
| 2,496,450 | Ehrenstein | Feb. 7, 1950 |
| 2,634,277 | Minlon | Apr. 7, 1953 |

OTHER REFERENCES

Fieser et al.: Natural Products Related to Phenanthrene, 3rd ed., pp. 407, 424–26 (1949).